(12) United States Patent
Yabe et al.

(10) Patent No.: US 6,405,825 B1
(45) Date of Patent: Jun. 18, 2002

(54) NOISE ABSORPTION BLADE MOUNTING STRUCTURE FOR WORKING VEHICLES

(75) Inventors: Mitsuo Yabe, New Castle Upon Tyne (GB); Takashi Kawakami, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/680,534

(22) Filed: Oct. 6, 2000

(30) Foreign Application Priority Data

Oct. 8, 1999 (JP) .......................................... 11-288786

(51) Int. Cl.[7] ................................................ F01N 1/10
(52) U.S. Cl. ...................... 181/204; 181/225; 180/69.2; 123/198 E
(58) Field of Search ................................ 181/204, 224, 181/225, 202, 205; 123/198 E; 180/69.2

(56) References Cited

U.S. PATENT DOCUMENTS

| | | | |
|---|---|---|---|
| 3,762,489 A | * 10/1973 | Proksch | 181/204 |
| 3,897,850 A | * 8/1975 | Thompson et al. | 118/204 |
| 4,260,037 A | * 4/1981 | Eline | 181/204 |
| 4,276,954 A | * 7/1981 | Romano | 181/224 |
| 4,483,412 A | * 11/1984 | Couturier | 181/204 |

* cited by examiner

Primary Examiner—Khanh Dang
(74) Attorney, Agent, or Firm—Varndell & Varndell, PLLC (57) ABSTRACT

To provide a noise absorption blade mounting structure for a working vehicle, which is enabled to be excellent in the draft straightening property in an air hole of the cover of an engine room and excellent in the strength and appearance of the cover, by making noise absorption blades having a high noise absorption effect of a simple structure to mount/demount the noise absorption blades simply in/from the air hole thereby to facilitate the tuning against the noises coming from the engine room and the maintenances of the noise absorption blades.

Each of the noise absorption blades 8 includes: a core member 14; noise absorption members 15 mounted on the two faces of the core member 14; and mounting members 11, 12 formed on the end faces of the noise absorption members 15. The cover 6 includes in its air hole 6a straightening members 6e for straightening the draft in front of, as taken in the ventilation direction, the noise absorption blades 8.

7 Claims, 13 Drawing Sheets

NOISE ABSORPTION BLADE MOUNTING STRUCTURE FOR WORKING VEHICLES

BACKGROUND OF THE INVENTION

1. Field of the Invention

The present invention relates to a noise absorption mounting structure for a working vehicle such as a hydraulic excavator and, more particularly, to a structure for mounting the noise absorption blades which can be tuned optimum against noises.

2. Related Art

In order to introduce the air for cooling the radiator or oil cooler of a working vehicle, an air hole is formed in the cover of an engine room or the like. Noise absorption blades may be mounted in the air hole so as to make lower the noises. This noise absorption blade mounting structure of the prior art is disclosed in Unexamined Published Japanese Patent Application No. H9-123771, for example, of which FIG. 20 is a section of an air hole portion.

Figure 20:
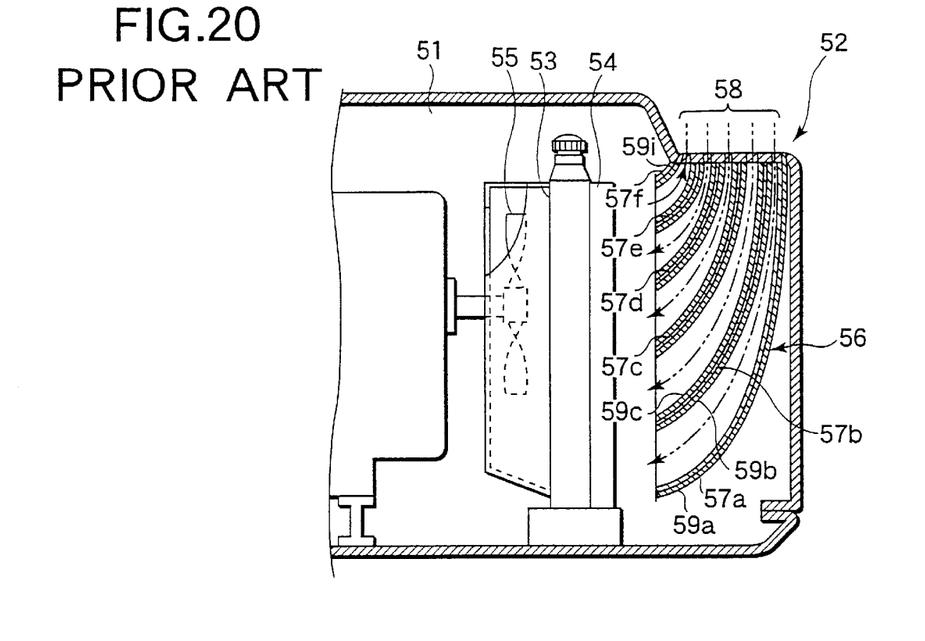
FIG. 20 is a sectional view showing a mounting example of the noise absorption blades of the prior art.

In FIG. 20, a cooling wind intake duct 56 is disposed in the space between an opening 52 in the upper portion of an engine room 51 and the front face portions of a radiator 53 and an oil cooler 54. The cooling wind intake duct 56 is composed of a plurality of wind guide plates 57*a* to 57*f*, by which a cooling wind 58 taken from the opening 52 is divided and is homogeneously introduced to the radiator 53 and the oil cooler 54. On the other hand, the wind guide plates 57*a* to 57*f* are covered on their faces exposed to the wind with noise absorption members 59*a* to 59*j*, and the exit end portions of the individual wind guide plates 57*a* to 57*f* are sufficiently spaced from the front face portions of the radiator 53 and the oil cooler 54. Thus, the noises emanating out of the engine room 51 are lowered, and the flow velocity fluctuation of the cooling wind 58 in the cooling wind intake duct 56 is suppressed to reduce the noises of a cooling fan 55.

Figure 21:
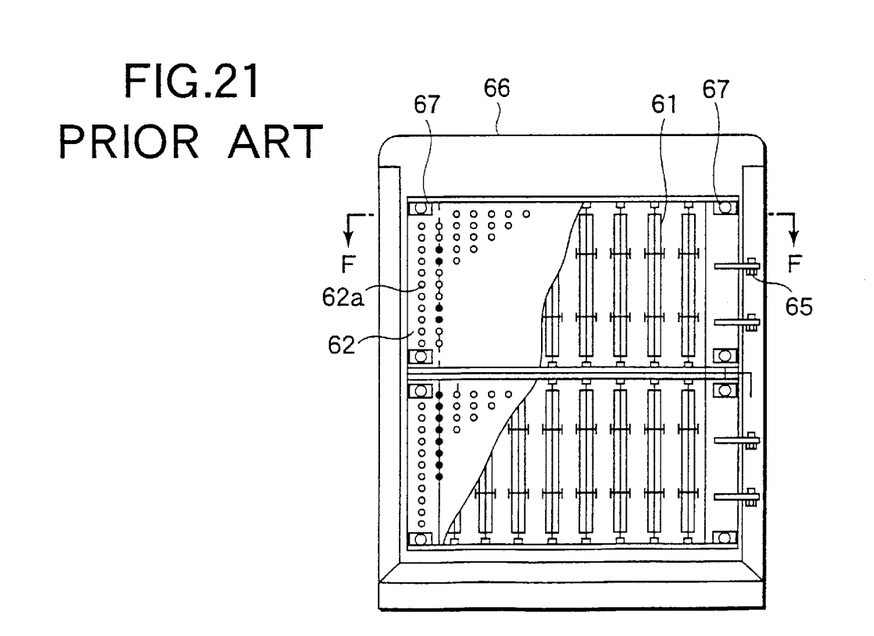
FIG. 21 is a sectional view showing another mounting example of the noise absorption blades of the prior art.
Figure 22:
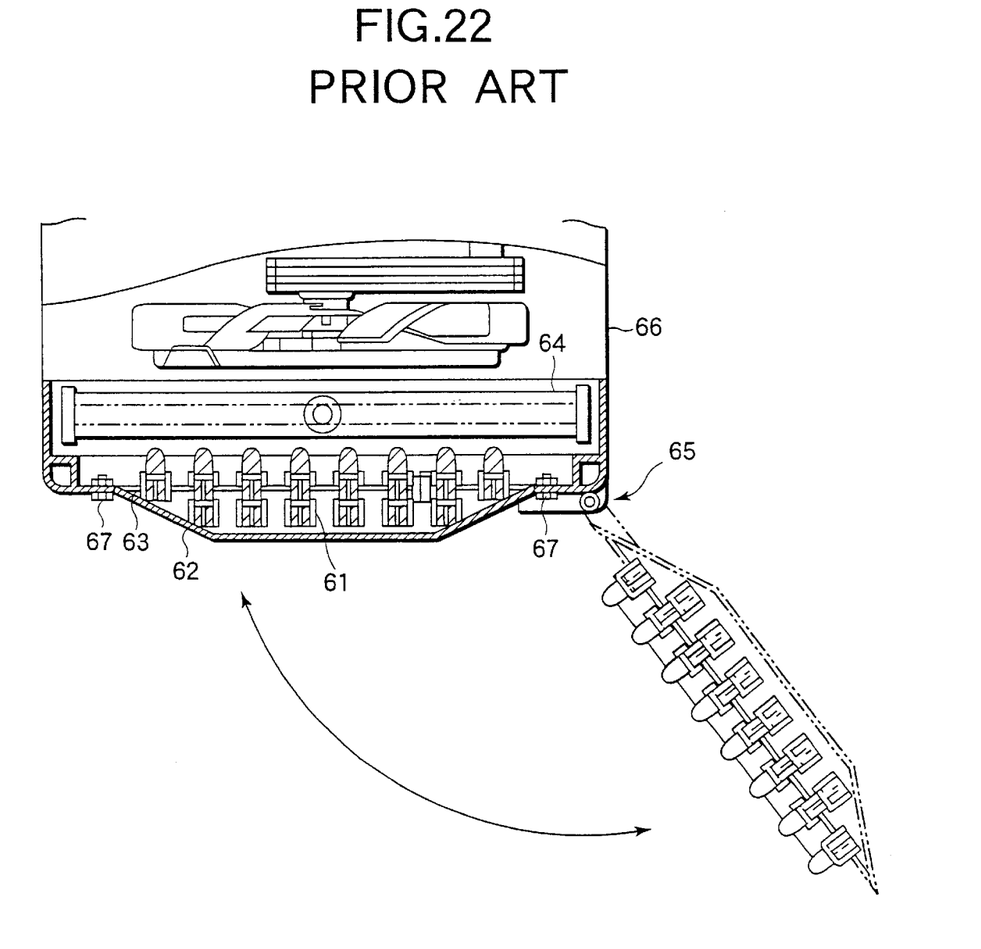
FIG. 22 is a sectional view taken along line F—F of FIG. 21.

Another technique of the prior art is disclosed in Unexamined Published Japanese Utility Model Application No. H5-50027, for example. FIGS. 21 and 22 are a front elevation and a sectional view of an air hole portion, as disclosed. FIG. 22 is a sectional view taken along line F—F of FIG. 21.

In FIGS. 21 and 22, noise absorption blades 61 are so mounted in the inner side portion 63 of a front mask 62 as to confront the whole area or a radiator core 64. When the front mask 62 is demounted for cleaning the radiator core 64, the noise absorption blades 61 can be demounted together with the front mask 62. Moreover, this front mask 62 mounting the noise absorption blades 61 are so hinged to a radiator guard 66 through a hinge mechanism 65 as can be opened and closed, and are fixed on the radiator guard 66 by means of bolts 67. This construction makes it easy to assemble the noise absorption blades 61 and to clean the radiator core 64.

However, the prior arts thus far described have the following problems.

In the former technique disclosed in Unexamined Published Japanese Patent Application No. H9-123771, the wind guide plates 57*a* to 57*f* are fixed in the engine room 51. This raises problems that no tuning can be made against the noises and that the noise absorption members 59*a* to 59*j* cannot be replaced even when they are deteriorated. On the other hand, the wind guide plates 57*a* to 57*f* and the noise absorption members 59*a* to 59*j* have different shapes and are high at their manufacture costs.

In the latter technique disclosed in Unexamined Published Japanese Utility Model Application No. 5-50027, on the other hand, There is caused by the structure of the noise absorption blades 61 a problem that the tuning is made difficult against the noises. Therefore, it takes a long time to design the noise reduction. Although a number of ventilation holes 62*a* are formed in the front mask 62, however, they have such a high ventilation resistance as to raise problems that the wind noises are high and that an air flow cannot be increased.

SUMMARY OF THE INVENTION

Noting the above-specified problems of the prior art, the invention has an object to provide a noise absorption blade mounting structure for a working vehicle, which is enabled to be excellent in the draft straightening property in an air hole of the cover of an engine room and excellent in the strength and appearance of the cover, by making noise absorption blades having a high noise absorption effect of a simple structure to mount/demount the noise absorption blades simply in/from the air hole thereby to facilitate the tuning against the noises coming from the engine room and the maintenances of the noise absorption blades.

In order to achieve the aforementioned object, according to a first aspect of the invention, there is provided a noise absorption blade mounting structure for a working vehicle, comprising: a cover covering a noise source including an engine, a cooling fan and a hydraulic unit and having an air hole for ventilating the ambient air therethrough, the cover being capable of being opened and closed; and a plurality of noise absorption blades disposed in the vicinity of the air hole for absorbing the noises which might otherwise leak from the inside to the outside of the cover. Each of the noise absorption blades includes: a core member; noise absorption members mounted on the two faces of the core member; and mounting members formed on the end faces of the noise absorption members. The cover includes in its air hole straightening members for straightening the draft in front of, as taken in the ventilation direction, the noise absorption blades.

According to the first aspect of the invention, the noise absorption members are mounted on the two faces of the core member so that the noise absorption is effected on the two faces of the ventilation passage. Therefore, the noise absorption area is doubled even with the noise absorption member having the same thickness as that of the prior art so that the noise absorption effect is improved. Since the core member is sandwiched between the noise absorption members, moreover, there is effected a damping act on to attenuate the sound waves, when reflected on the core member, by their energy loss. On the other hand, the sound waves, as emanating from the opposite side of the core member, are also attenuated by the noise absorption action of the noise absorption member on the opposite side of the core member so that the noise absorption effect is further improved.

As a result, even with the simple construction and the same size as that of the prior art, the noise absorption blades can be given a high noise absorption reducing effect at the air hole of the vehicle.

On the other hand, the mounting members are formed at the end faces of the noise absorption member so that the noise absorption blades can be firmly mounted on the vehicle body by the simple construction having a small number of parts.

As a result, the noise absorption blades are given a structure capable of enduring the severe vibrations or impacts on the vehicle.

Since the noise absorption blades have the simple construction, moreover, their individual components are set as the standard parts. By cutting and bending works simply, therefore, the noise absorption blades of special sizes can be easily manufactured in relation to the noise sources or the peripheral devices so that they can be easily tuned at low costs.

On the other hand, he straightening members for straightening the draft are disposed in front of the noise absorption blades and in the air hole of the cover so that the draft flows smoothly with little ventilation resistance but without any vortex or separation. As a result, there can be retained, a sufficient cooling wind. On the other hand, the dust or moisture is prevented from coming from the end faces of the noise absorption members at the end portions, as taken in the ventilation direction, of the noise absorption blades so that the noise absorption effect can be prevented from aging.

Moreover, the straightening member also acts as a strengthening member to retain the strength of the air hole of the cover, and the noise absorption blades and their mounting portions are located at the back of the straightening members thereby to provide a satisfactory appearance.

According to a second aspect of the invention, there is provided a noise absorption blade mounting structure for a working vehicle, comprising: a cover covering a noise source including an engine, a cooling fan and a hydraulic unit and having an air hole for ventilating the ambient air therethrough, the cover being capable of being opened and closed; and a plurality of noise absorption blades disposed in the vicinity of the air hole for absorbing the noises which might otherwise leak from the inside to the outside of the cover. Each of the noise absorption blades includes: a core member; noise absorption members on the two faces of the core member; and mounting members formed on the end fades of the noise absorption members. The mounting members are detachably mounted at their one-side end portions on the frames of the air hole of the cover.

According to the second aspect of the invention, the noise absorption members are mounted on the two faces of the core member so that the noise absorption is effected on the two faces of the ventilation passage. Therefore, the noise absorption area is doubled even with the noise absorption member having the same thickness as that of the prior art so that the noise absorption effect is improved. Since the core member is sandwiched between he noise absorption members, moreover, there is effected a damping action to attenuate the sound waves, when reflected on the core member, by their energy loss. On the other hand, the sound waves, as emanating from the opposite side of the core member, are also attenuated by the noise absorption action of the noise absorption member on the opposite side of the core member so that the noise absorption effect is further improved.

As a result, even with the simple construction and the same size as that of the prior art, the noise absorption blades can be given a high noise absorption reducing effect at the air hole of the vehicle.

On the other hand, the mounting members are formed at the end faces of the noise absorption member so that the noise absorption blades can be firmly mounted on the vehicle body by the simple construction having a small number of parts.

As a result, the noise absorption blades are given a structure capable of enduring the severe vibrations or impacts on the vehicle.

Since the noise absorption blades have the simple construction, moreover, their individual components are set as the standard parts. By cutting and bending works simply, therefore, the noise absorption blades of special sizes can be easily manufactured in relations the noise sources or the peripheral devices so that they can be easily tuned at low costs.

On the other hand, the one-side end portions of the mounting members are mounted on the air hole frames so that no mounting bracket for the noise absorption blades need be additionally provided to reduce the weight.

The noise absorption blades are detachably mounted so that they can be easily replaced or cleaned for maintenances by opening the cover. On the other hand, the noise absorption blades move together with the cover so that the radiator or the oil cooler can be easily cleaned by opening the cover.

In the second aspect of the invention, according to a third aspect, the mounting members include, at their one-side end portions, mounting portions perpendicular to the ventilation direction for fastening the noise absorption blades in parallel with the ventilation direction.

According to the third aspect, the mounting portions, as perpendicular to the ventilation direction, are disposed at the one-side end portions of the mounting members, and the noise absorption blade is fastened in parallel with the ventilation direction, so that the core member does not become loose. As a result, the noise absorption blades can be easily stacked without deteriorating the straightening effect. On the other hand, the noise absorption blade is not distorted to eliminate the problem that the appearance is poor.

In the first and second aspects of the invention, according to a fourth aspect, noise absorption blades having a larger noise absorption area are arranged an the front projection of at least the cooing fan.

According to the fourth aspect, in the front projection of at least the cooling fan, there are arranged the noise absorption blades which have a larger noise absorption area, so that the serious noises in the vicinity of the cooling fan having much flow rate and many rotary portions can be easily reduced and tuned to a low level by the inexpensive method.

In the first and second aspects of the invention, according to a fifth aspect, joint members joint the mounting members of the noise absorption blades to each other.

According to the fifth aspect, the mounting members of the noise absorption blades are jointed to each other by the joint member, the noise absorption blades are integrated to have a mounting structure of a box structure. As a result, the rigidity is improved together to apply no excessive force to the mounting portions of the noise absorption blades this construction is effective especially for the-noise absorption blades of a cantilever mounting structure having a large noise absorption area.

DESCRIPTION OF THE PREFERRED EMBODIMENTS

Embodiments of the noise absorption blade mounting structure for the working vehicle according to the invention will be sequentially described with reference to FIGS. 1 to 19.

Figure 1:
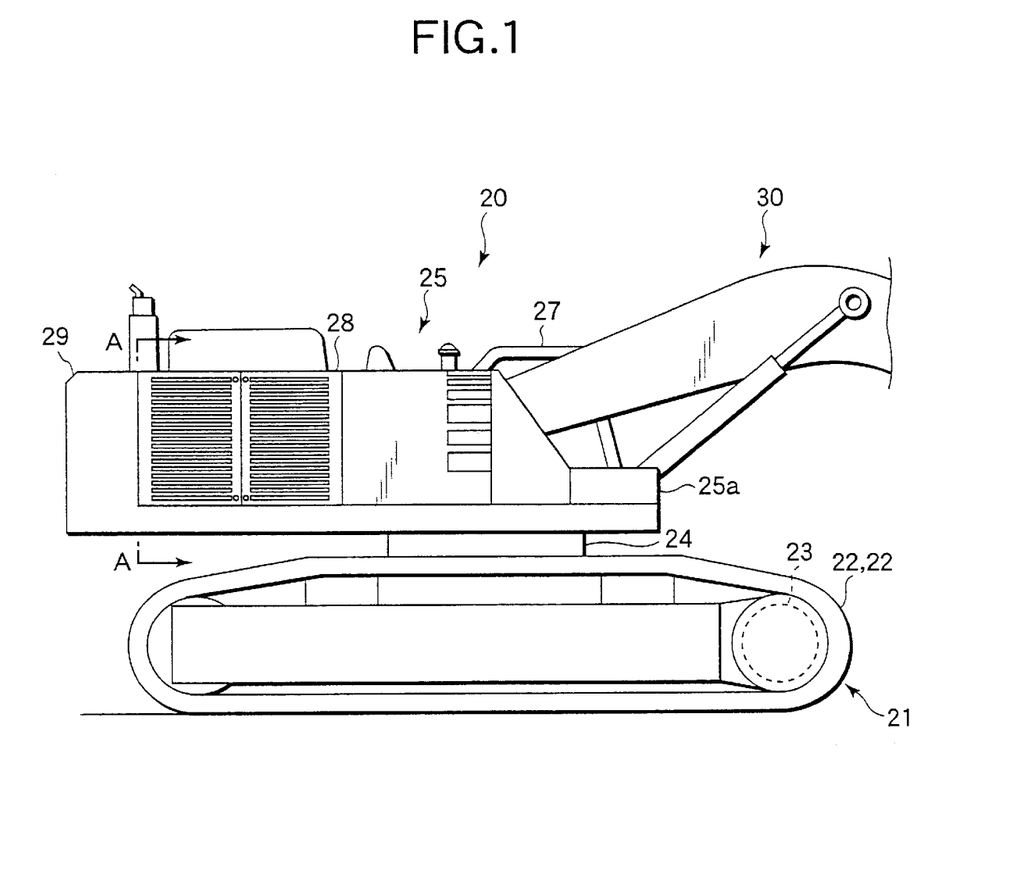
FIG. 1 is a side elevation showing a portion of a hydraulic excavator, to which the noise absorption blades of a working vehicle according to the invention are applied.

The working vehicle, to which the invention is applied, is exemplified by a hydraulic excavator 20 in FIG. 1.

In FIG. 1, a travel unit 21 is provided with a pair of left-hand and right-hand crawlers 22 and 22, which are individually driven by drive motors 23 so that they can freely run. On the central portion of the travel unit 21, there is placed through a swivel device 24 a revolving unit 25, which is enabled to revolve freely with respect to the swivel device 24 by the not-shown revolving motor.

The revolving unit 25 is provided with an implement 30, a driver's compartment 27, an engine room 28, a counter weight 29 and so on, which are arranged on a revolving frame 25a.

Moreover, the hydraulic excavator 20 is caused to excavate the sand, pebble and so on by driving the drive motors 23 and 23, the revolving motor and the cylinders for the implement 30 hydraulically.

Figure 2:
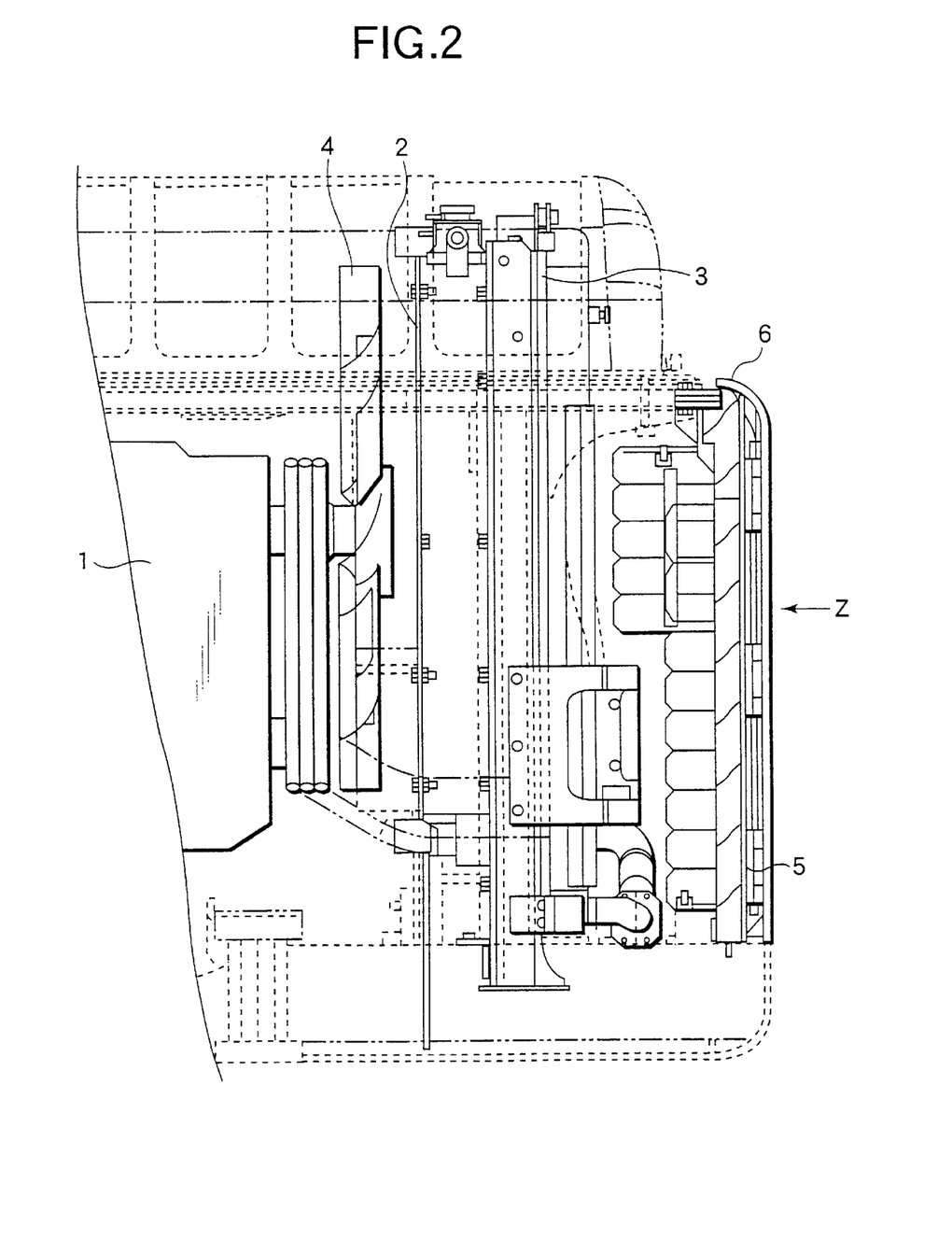
FIG. 2 is a sectional view showing the same but taken along line A—A of FIG. 1.

Here will be described the engine room 28 with reference to FIGS. 2 and 3. FIG. 2 is a sectional view taken along line A—A of FIG. 1, and FIG. 3 is a view taken in the direction of arrow Z of FIG. 2.

Figure 3:
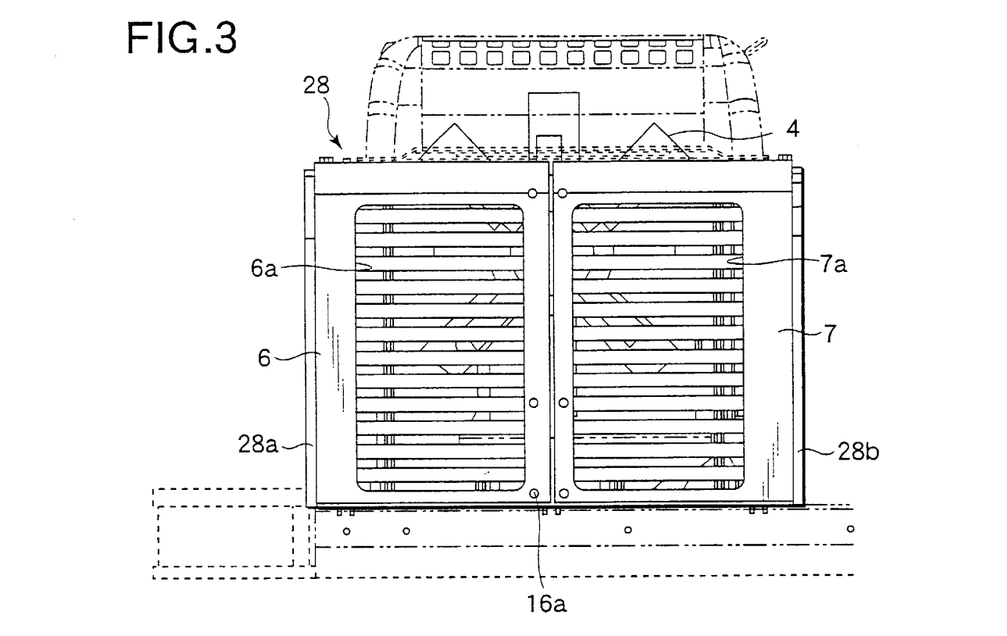
FIG. 3 is a view showing the same but taken in the direction of arrow Z of FIG. 2.

In the engine room 28, as shown in FIGS. 2 and 3, there is arranged an engine 1 which has a cooling fan 4 directed backward of the vehicle. In the engine room 28, there are arranged at the back of the engine 1 an engine cooling radiator 2 and an hydraulic unit cooling oil cooler 3, which are longitudinally juxtaposed to each other. On the other hand, these radiator 2 and oil cooler 3 are cooled with the cooling wind, which is sucked from the outside to the inside of the engine room 28 through air holes 6a and 7a, as formed in covers 6 and 7 hinged openably to the left and right sides of the back face of the engine room 28, by the cooling fan 4 arranged in front of the radiator 2 and driven by the engine 1.

Figure 4:
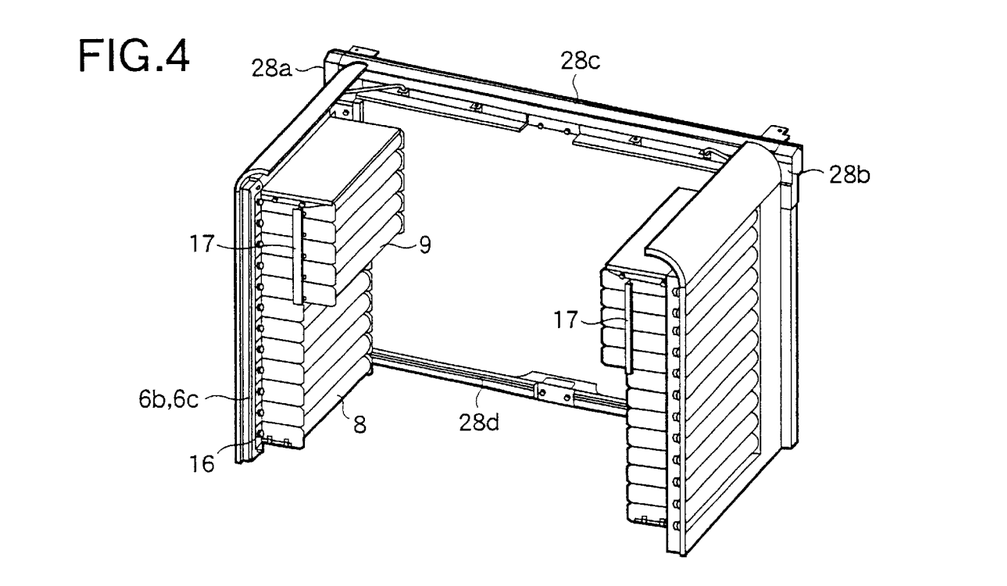
FIG. 4 is a perspective view showing the same in the state in which covers are opened.

Here will be described the covers 6 and 7 of the engine room 28 with reference to FIGS. 2 to 4. FIG. 4 is a perspective view showing the state in which the covers 6 and 7 are opened.

As shown in FIGS. 2 and 3, the covers 6 and 7 are individually operably hinged, as designated by numeral 5, to vertical frames 28a and 28b on the back face of the engine room 28. Here, the cover 6 and the cover 7 have the same structure and function so that the description will be made exclusively on the cover 6.

In this cover 6, there is formed the air hole 6a, through which the ambient air is sucked to the inside. Through this air hole 6a, on the contrary, there are released the noises which are made inside of the engine room 28. In order to prevent the noises from going from the inside to the outside of the engine room 28, therefore, a plurality or noise absorption blades 8 and 9 are mounted inside of the cover 7 on frames 6b and 6c at the air hole 6a by means of bolts 16, as shown in FIG. 4, thereby to reduce the noises.

Here, the cover 6 is fixed, when in the closed state, on upper and lower horizontal frames 28c and 28d of the engine room 28 by means of bolts 16a.

Here will be described the structures of the noise absorption blades 8 and 9 with reference to FIGS. 5 to 8.

Figure 5:
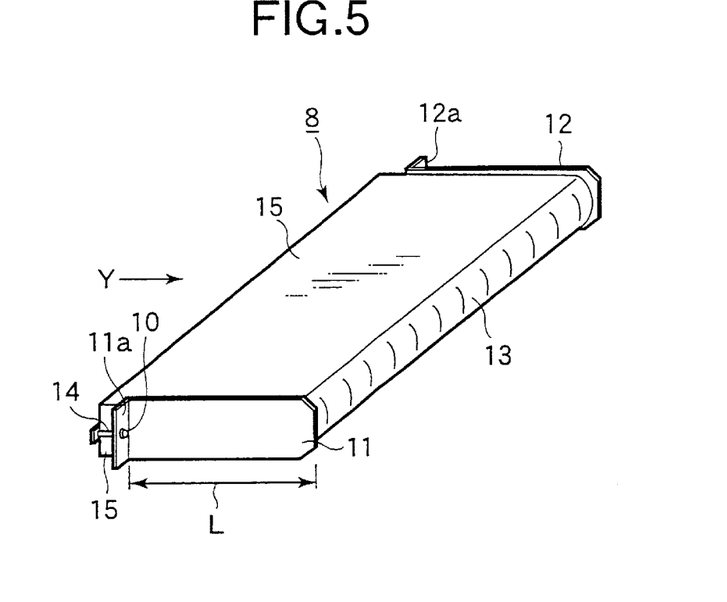
FIG. 5 is a perspective view of a noise absorption blade of the same.
Figure 6:
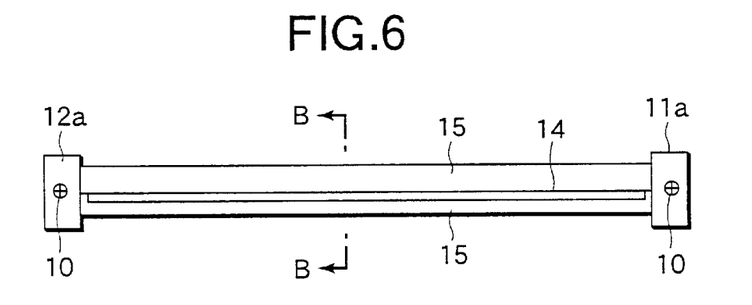
FIG. 6 is a view showing the same but taken in the direction of arrow Y of FIG. 5.
Figure 7:
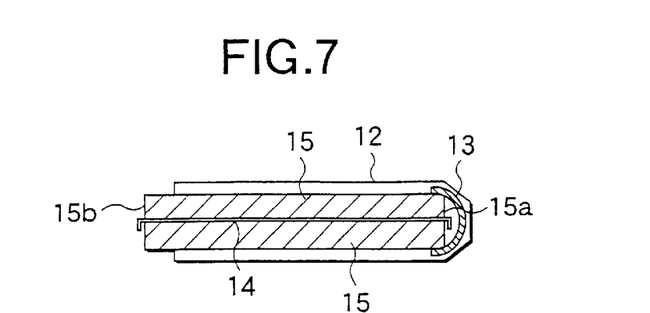
FIG. 7 is a sectional view showing the same but taken along line B—B of FIG. 6.
Figure 8:
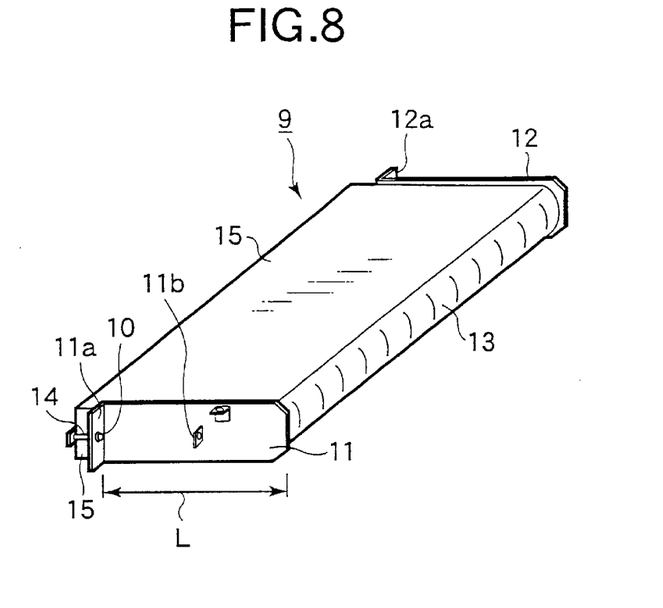
FIG. 8 is a perspective view showing a noise absorption blade according to another embodiment.

Here, the noise absorption blades 8 and the noise absorption blades 9 basically have the same structure and function, excepting that they are different in their lengths in the ventilation direction, as shown in FIG. 5, and that the noise absorption blades 9 have a joint member supporting portion, as shown in FIG. 8. Therefore, the noise absorption blades 8 and 9 will be described by designating their components by common-reference numerals. Here will be described the noise absorption blade 8 with reference to FIGS. 5 to 7 and the noise absorption blade 9 on its different point with reference to FIG. 8. FIG. 5 is a perspective view of the noise absorption blade 8. FIG. 6 is a view taken in the direction of arrow Y of FIG. 5, and FIG. 7 is a sectional view taken along line B—B of FIG. 6. FIG. 8 is a perspective view of the noise absorption blade 9 according to another embodiment.

Between the confronting inner faces of left and right mounting members 11 and 12, as shown in FIGS. 5 to 7, there is fixed a core member 14 which is disposed at the center portion in the shorter direction (or in the vertically shown direction) of the mounting members 11 and 12. At one-side longitudinal end portions and between the confronting inner faces of the left and right mounting members 11 and 12, on the other hand, there is fixed a generally semi-cylindrical straightening member 13, which has its semi-cylindrical outer face directed to the outside. The core member 14 has bent portions at the longitudinal end portions of the mounting members 11 and 12. On the two faces of the cover member 14, on the other hand, there are adhered noise absorption members 15 which are inserted at their end portions 15a, as located on the side where the straightening member 13 is mounted, into the inside of the straightening member 13. The opposite end portion of the noise absorption member 15 is inserted into a straightening member 6e (as should be referred to FIG. 10) mounted on the cover 6, as will be described in more detail, when the noise absorption blade 8 is mounted on the cover 6. On the other hand, the noise absorption member 15 is coated on its surface with an air-impermeable film.

On the other hand, the left and right mounting members 11 and 12 are equipped at their other longitudinal end portions with mounting portions 11a and 12a, respectively, which have mounting holes 10 and which are directed outward of the mounting members 11 and 12. The noise absorption blades 8 and 9 are so mounted on the frames 6b and 6c inside of the cover 6 that the longitudinal direction of the mounting members 11 and 12 may be generally perpendicular to the cover 6, namely, that the core member 14 may be generally perpendicular to the cover 6.

When the left and right mounting members 11 and 12 have a larger length L (in the ventilation direction), as shown in FIG. 8, the noise absorption blade 9 is equipped with a support member 11b for supporting the later-described joint member. The noise absorption blades 8 and 9 are selected to have their proper lengths L in accordance with the mounting spaces, the noise levels and so on of the places where they are used. In this embodiment, the noise absorption blade 9 is made longer than the noise absorption blade 8.

Figure 9:
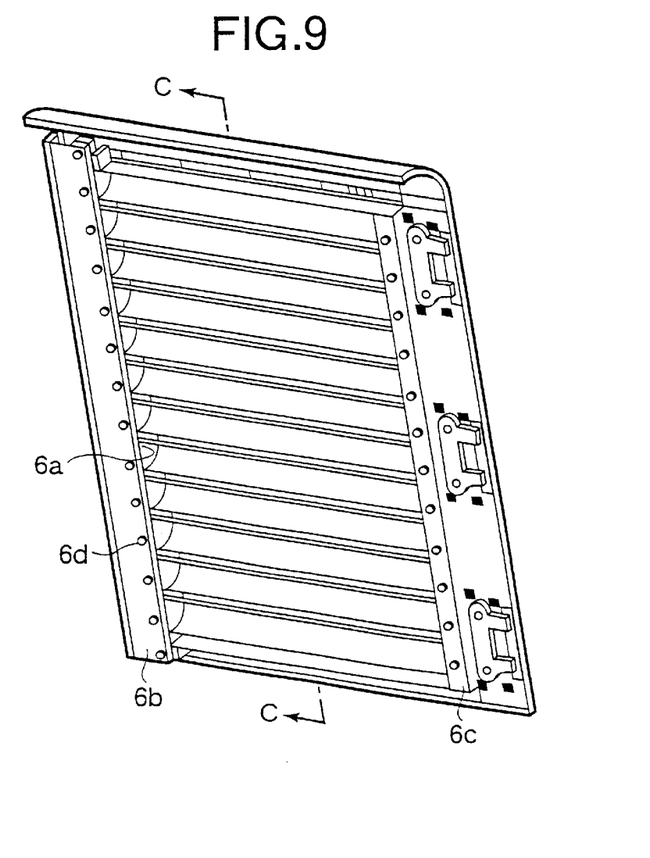
FIG. 9 is a perspective view showing the inner side of the cover.
Figure 10:
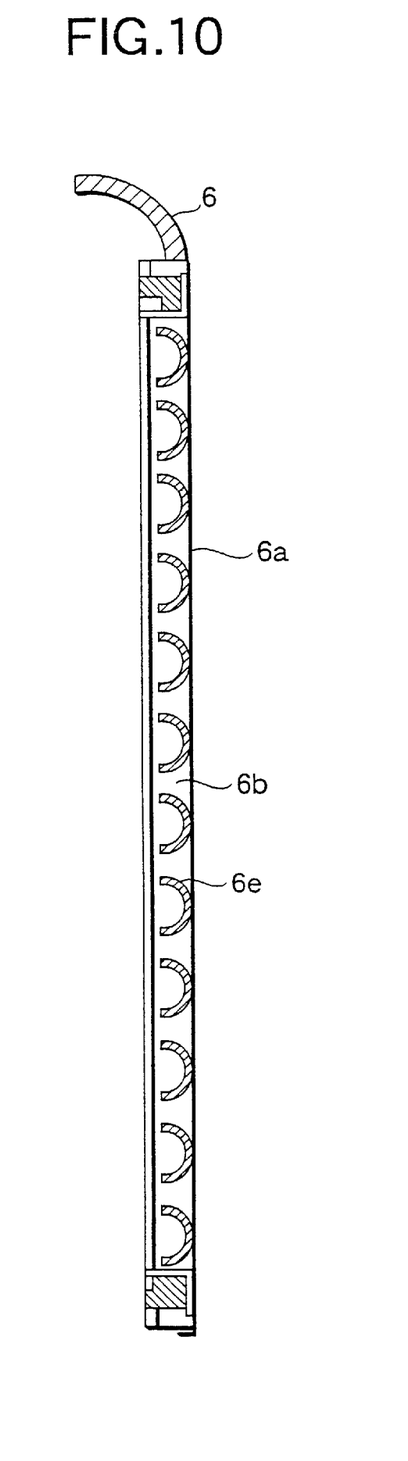
FIG. 10 is a sectional view taken along line C—C of FIG. 9.

Here will be described the mounting portion of the cover 6 with reference to FIGS. 9 and 10. FIG. 9 is a perspective view of the inner side of the cover 6, and FIG. 10 is a sectional view taken along line C—C of FIG. 9.

On the inner side of the cover 6, as shown in FIG. 9, there are fixed the left and right frames 6b and 6c which confront each other through the air hole 6a. In the back faces of these frames 6b and 6c, there are tapped holes 6d for mounting the noise absorption blades 8. Between the left and right frames 6b and 6c, as shown in FIG. 10, there are fixed a plurality of semi-cylindrical straightening members 6e at a predetermined interval.

Figure 11:
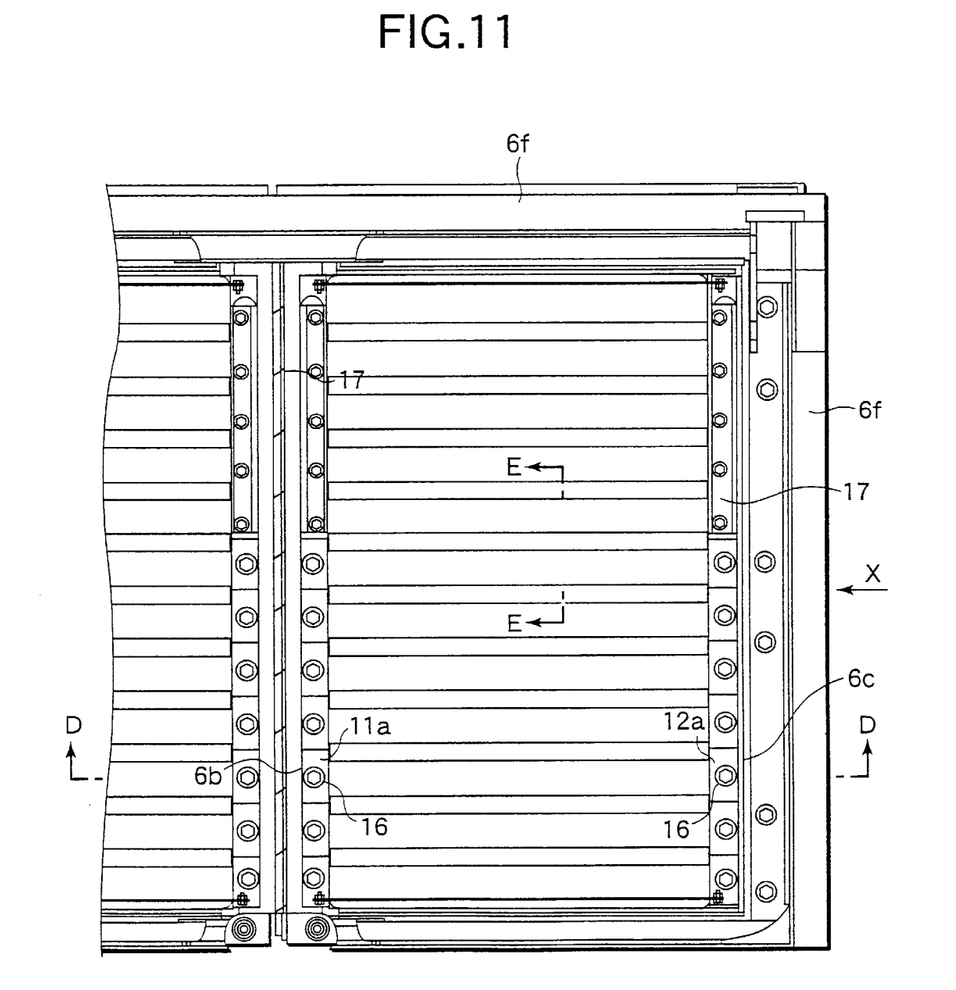
FIG. 11 is a view showing the state in which the noise absorption blades are mounted.
Figure 12:
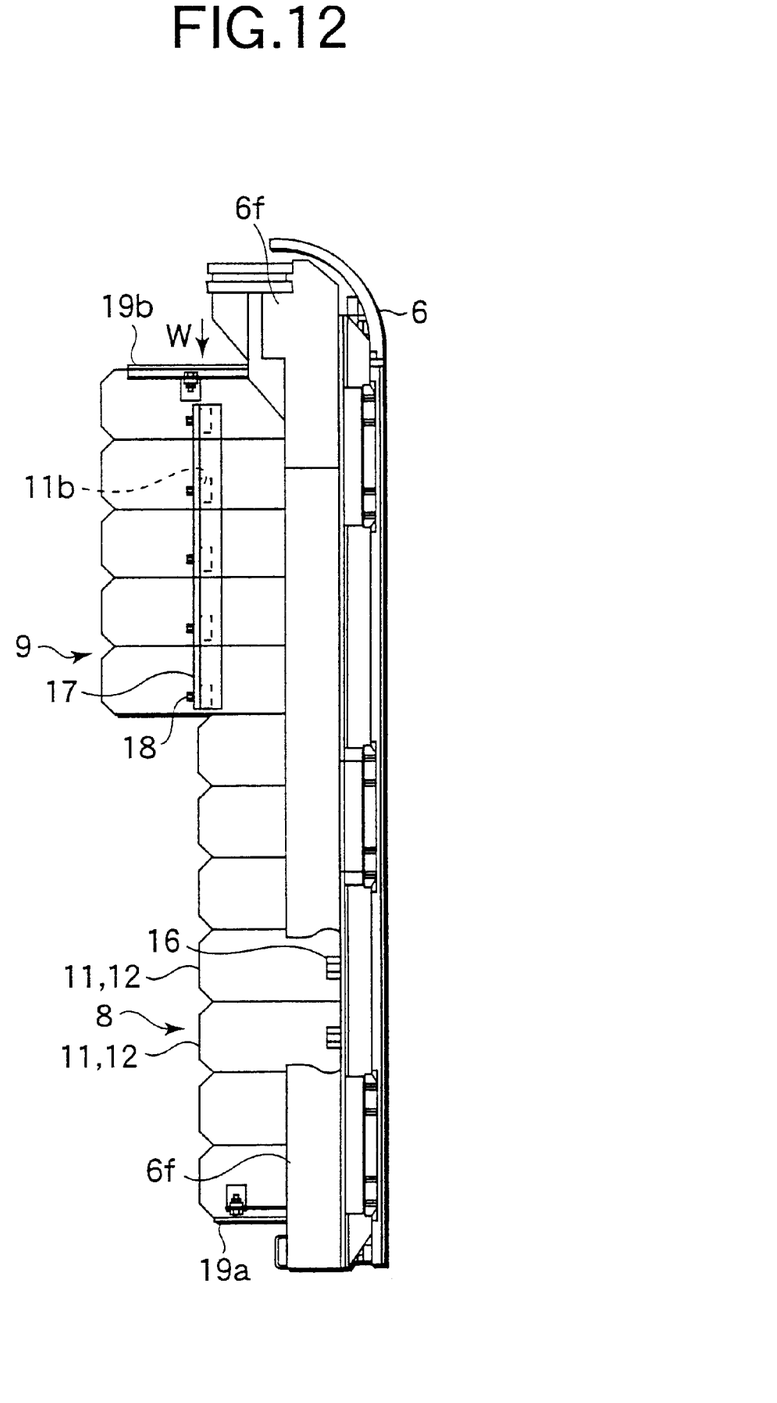
FIG. 12 is a view taken in the direction of arrow X of FIG. 11.
Figure 13:
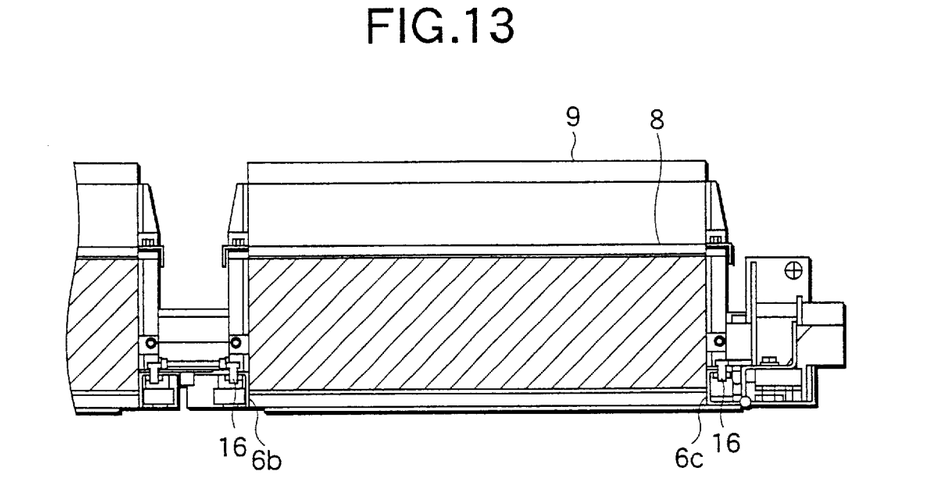
FIG. 13 is a sectional view taken along line D—D of FIG. 11.
Figure 14:
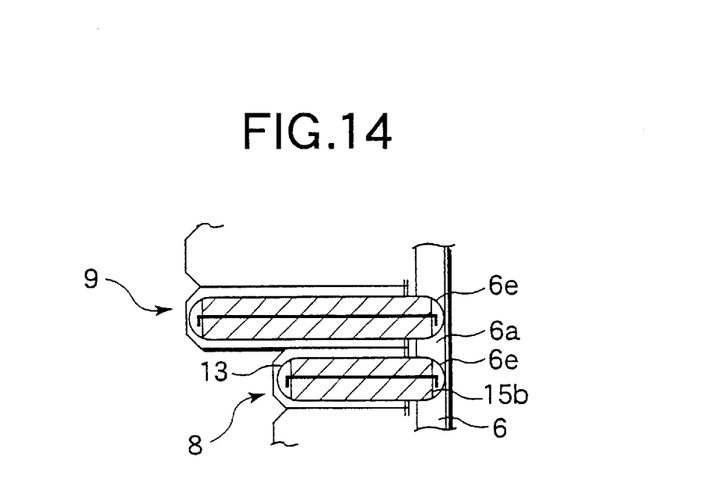
FIG. 14 is a sectional view taken along line E—E of FIG. 11.

Here will be described how to mount the aforementioned noise absorption blades 8 and 9 with reference to FIGS. 11 to 15. FIG. 11 is a view showing the state in which the noise absorption blades 8 and 9 are mounted, and FIG. 12 is a view taken in the direction of arrow X of FIG. 11. On the other hand, FIG. 13 is a sectional view taken along line D—D of FIG. 11; FIG. 14 is a sectional view taken alone line E—E of FIG. 11; and FIG. 15 is a view taken along the direction of arrow W of FIG. 12.

As shown in FIGS. 11 to 13, the noise absorption blades 8 are arranged in a vertically juxtaposition at the lower portion of the cover 6. In this arrangement, the individual noise absorption blades 8 are so sequentially stacked that the left and right mounting members 11 and 12 abut at their upper and lower end faces against each other, and their mounting portions are fastened to the frames 6b and 6c of the cover 6 by means of the bolts 16. At the upper portion of the cover 6, too, the noise absorption blades 9 are fastened at their mounting portions to the frames 6b and 6c. At this time, as shown in FIG. 14, the back end portions 5b of the noise absorption blades 8 and 9 are inserted into the straightening members 6e which are disposed in the cover 6.

Figure 15:
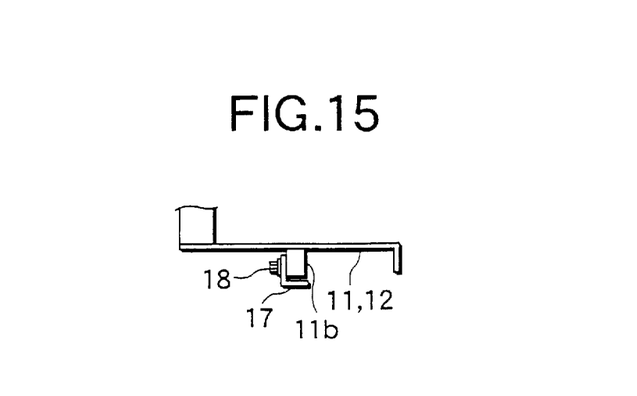
FIG. 15 s a view taken in the direction of arrow W of FIG. 12.

On the other hand, the noise absorption blades 9 are likewise mounted, as shown in FIGS. 12 and 15. The structure for mounting the noise absorption blades by fastening joint members 17 by means of bolts 18 to the support members 11b, as disposed on the outer sides of the left and right mounting members of the individual noise absorption blade 9, is made into the box structure to enhance the rigidity.

As shown in FIG. 12, on the other hand; plates 19a and 19b are attached Lo the lowermost noise absorption blade 8 and the uppermost noise absorption blade 9 thereby to prevent the sucked wind from leaving vertically. On the other hand, the cover 6 is surrounded at its inner periphery by a packing 6f to improve the air-tightness.

Here will be described the actions and effects of the embodiments.

Figure 16:
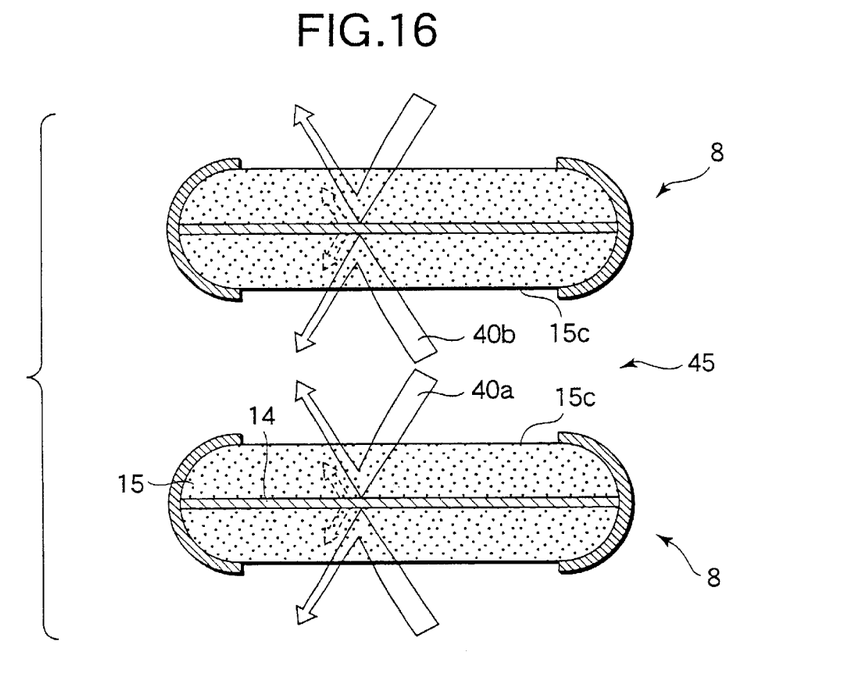
FIG. 16 is a schematic diagram showing a ventilation passage.

First of all, the noise absorption of the noise absorption blades 8 will be described with reference to FIG. 16. FIG. 16 is a diagram showing the ventilation passage schematically. A similar discussion applies to the noise absorption blades 9.

In FIG. 16, sound waves 40a, as incident on the surface 15c of one noise absorption blade 8 of a ventilation passage 45, pass while being attenuated through the inside of the noise absorption member 15. The sound waves 40a, as having arrived at the core member 14, are substantially wholly reflected to pass again while being attenuated through the inside of the noise absorption member 15 so that they are finally released to the outside. As a result, the sound waves 40a are attenuated while going forward and backward through the inside of he noise absorption member 15. As indicated by dotted arrows, moreover, the sound waves, as emanating to the opposite side without being reflected on the core member 14, are also attenuated by the noise absorption member 15 on the opposite side.

On the other hand, sound waves 40b, as incident on the surface 15c of the other noise absorption blade 8 of the ventilation passage 45, are likewise attenuated.

Since the core member 14 is sandwiched between the noise absorption members 15, moreover, there is effected a damping action to attenuate the sound waves 40a and 40b, when reflected on the core member 14, by their energy loss. As a result, the noise reducing effect is further improved.

Since the noise absorption member 15 is coated on its surface with the air-impermeable film, on the other hand, it does not permeate the dust or moisture, as might otherwise deteriorate the noise absorption characteristics. On the other hand, the sectional portions of the noise absorption member 15 are covered, as shown in FIGS. 5 and 13, with the mounting members 11 and 12 and the straightening members 6e and 13 so that the noise absorption member 15 can be kept clear of the dust or moisture. This coverage can prevent the noise absorption member 15 from aging, to provide an excellent noise absorption blade 8 retaining the noise reducing effect for a long time.

As shown in FIG. 5, on the other hand, the mounting members 11 and 12 are formed to cover the end faces of the noise absorption member 15 so that the noise absorption blades 8 and 9 can be firmly mounted on the vehicle body by the simple construction having a small number of parts. As a result, the noise absorption blades 8 and 9 are given a structure capable of enduring the severe vibrations or impacts on the vehicle.

As shown in FIG. 14, on the other hand the straightening members 6e for straightening the draft are disposed in front of the noise absorption blades 8 and 9 and in the air hole 6a of the cover 6 so that the cooling wind flows smoothly with little ventilation resistance but without any vortex or separation. On the other hand, the dust or moisture is prevented from coming from the end faces of the noise absorption members 15 at the end portions; as taken in the ventilation direction, of the noise absorption blades 8 and 9 so that the noise absorption members 15 car, be prevented from aging.

As shown in FIG. 10, moreover, the straightening member 6e also acts as a strengthening member to retain the strength of the air hole 6a of the cover 6 while providing a satisfactory appearance.

As shown in FIG. 11, on the other hand, the one-side end portions (or the mounting portions) of the mounting members 11 and 12 are mounted on the air hole frames 6b and 6c so that no mounting bracket or the noise absorption blades 8 and 9 need be additionally provided to reduce the weight.

The noise absorption blades 8 and 9 are detachably mounted so that they can be easily replaced or cleaned for maintenances by opening the cover 6. On the other hand, the noise absorption blades 8 and 91 move together with the cover 6 so that the radiator 2 or the oil cooler 3 can be easily cleaned by opening the cover 6.

As shown in FIG. 5, mounting portions 11a and 12a, as perpendicular to the ventilation direction, are disposed at the one-side end portions of the mounting members 11 and 12, and the noise absorption blade 8 is fastened in parallel with the ventilation direction, so chat the core member 14 does not become loose. As a result, the noise absorption blades 8 and 9 can be easily stacked without deteriorating the straightening effect. On the other hand, the noise absorption blade 8 is not distorted to provide a satisfactory appearance.

In the front projection of the cooling fan 4, as shown in FIGS. 2 and 4, there are arranged the noise absorption blades 9 which have a larger noise absorption area (as may be elongated perpendicularly to the ventilation direction although elongated in the ventilation direction the embodiment), so that the serious noises by the cooling fan 4 can be easily reduced and tuned by the inexpensive method.

Figure 17:
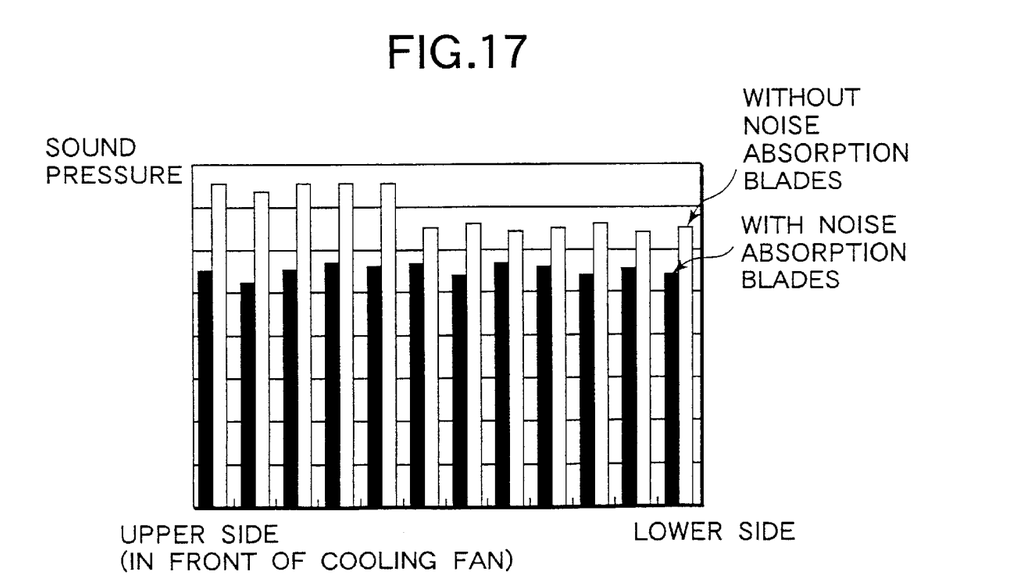
FIG. 17 is a diagram showing a noise reducing effect.

FIG. 17 illustrates the noise reducing effect of the noise absorption blades 8 and 9. The abscissaa indicates the mounted positions of the noise absorption blades 8 and 9, and the ordinate indicates the sound level of the noises. At the individual mounting positions, the blank graphs indicate the sound pressure levels when the noise absorption blades 8 and 9 are not mounted, whereas the solid graphs indicate the sound pressure levels when the no-se absorption blades 8 and 9 are mounted. Thus, there are clearly illustrated the noise reduced effect by the noise absorption blades 9 having the larger noise absorption area. By mounting the noise absorption blades 9 having the larger noise absorption area on the upper side which is located in front of the cooling fan in the ventilation direction to have the higher sound pressure, as illustrated, the sound pressure can be effectively reduce to lower the overall noises.

The mounting members 11 and 12 of the noise absorption blades 9 are jointed to each other by the joint member 17, as shown in FIGS. 12 and 15, the noise absorption blades 9 are integrated to make the mounting structure into the box structure. As a result, the rigidity is improved to apply no excessive force to the mounting portions of the noise absorption blades 9.

Figure 18:
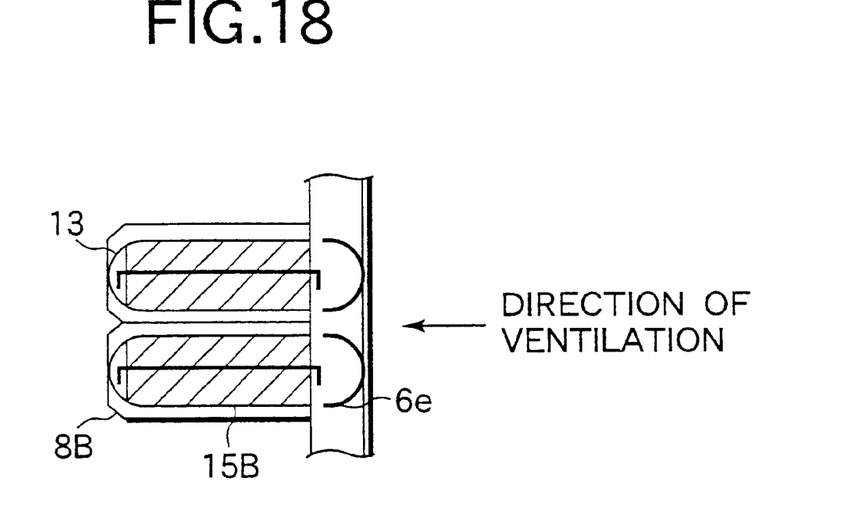
FIG. 18 a diagram showing another mounting example of noise absorption blades.

Here in the aforementioned embodiment, a noise absorption blade 8B may be mounted such that the end of a noise absorption member 15B in the ventilation direction is spaced apart from the straightening member 6e of the cover 6, as shown in FIG. 18.

Figure 19:
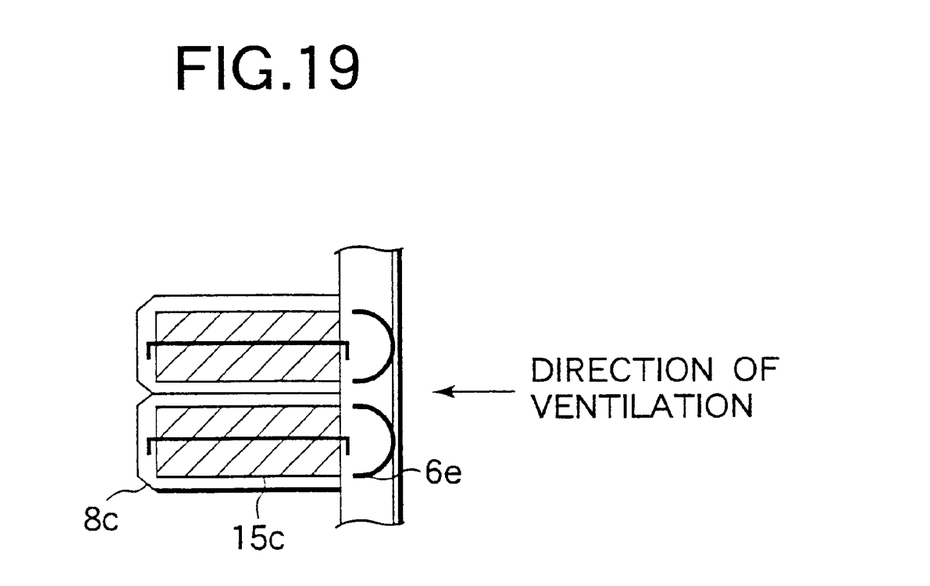
FIG. 19 a diagram showing another mounting example of noise absorption blades.

In the aforementioned embodiment, on the other hand, a noise absorption blade 8C may be mounted such that the straightening member 13 on the opposite end, as taken in the ventilation direction, of a noise absorption member 15C is omitted, as shown in FIG. 19.

According to the noise absorption blade mounting structure for the mounting vehicle according to the invention, as has been described hereinbefore, the noise absorption members are mounted on the two faces of the core member of the noise absorption blade so that the noises are highly attenuated to improve the noise reducing effect.

Since the noise absorption blades have the simple construction, on the other hand, their individual components are set as the standard parts. By cutting and bending works simply, therefore, the noise absorption blades of special sizes can be easily manufactured in relation to the noise sources or the peripheral devices so that they can be easily tuned at low costs.

Since the noise absorption blades are detachably mounted, on the other hand, they can be replaced or cleaned for maintenances.

What is claimed is:

1. A noise absorption blade mounting structure for a working vehicle, comprising: a cover covering a room having a noise source, said room including an engine, a cooling fan and a hydraulic unit, said cover having an air hole formed therein for ventilating ambient air therethrough and through which noises made within the room are released, said cover being operably hinged to open and close the room; and a plurality of noise absorption blades being disposed in the vicinity of said air hole for absorbing noises which might otherwise leak from inside the room to outside of said cover, wherein each of said noise absorption blades includes: a core member; noise absorption members mounted on the two faces of said core member; and mounting members formed on the end faces of each of said noise absorption members, and wherein straightening members for straightening the ventilating ambient air are respectively disposed in front of the noise absorption blades and in the air hole of the cover for straightening a draft of air through the air hole.

2. A noise absorption blade mounting structure for a working vehicle, comprising: a cover covering a room having a noise source, said room including an engine, a cooling fan and a hydraulic unit, said cover having an air hole formed therein for ventilating ambient air therethrough and through which noises made within the room are released, said cover being operably hinged to open and close the room; and a plurality of noise absorption blades being disposed in the vicinity of said air hole for absorbing noises which might otherwise leak from inside the room to outside of said cover, wherein each of said noise absorption blades includes: a core member; noise absorption members mounted on the two faces of said core member; and mounting members are formed on the end faces of each of said noise absorption members, and wherein said mounting members are detachably mounted at respective mounting portions on an air hole frame arranged about the air hole of said cover.

3. A noise absorption blade mounting structure for a working vehicle according to claim 2, wherein said mounting members include mounting portions perpendicular to the ventilation direction for fastening said noise absorption blades in parallel with the ventilation direction.

4. A noise absorption blade mounting structure for a working vehicle according to claim 1, further comprising:

two sizes of noise absorption blades, one having a larger noise absorption area than the other, wherein the noise absorption blades with a larger noise absorption area are arranged to correspond to the portion of the cover covering at least said cooling fan.

5. A noise absorption blade mounting structure for a working vehicle according to claim 1, further comprising:

joint members for jointing the mounting members of said noise absorption blades to each other.

6. A noise absorption blade mounting structure for a working vehicle according to claim 2, further comprising:

two sizes of noise absorption blades, one having a larger noise absorption area than the other, wherein the noise absorption blades with a larger noise absorption area are arranged to correspond to the portion of the cover covering at least said cooling fan.

7. A noise absorption blade mounting structure for a working vehicle according to claim 2, further comprising:

joint members for jointing the mounting members of said noise absorption blades to each other.

* * * * *